Nov. 26, 1968 G. R. STUTZMAN 3,412,462

METHOD OF MAKING HERMETICALLY SEALED THIN FILM MODULE

Original Filed May 6, 1965 3 Sheets-Sheet 1

INVENTOR
G. R. Stutzman

BY H. H. Losche
Attorney

INVENTOR.
G. R. Stutzman
BY H. H. Loeche
Attorney

METHOD OF MAKING HERMETICALLY SEALED THIN FILM MODULE

Original Filed May 6, 1965 3 Sheets-Sheet 3

INVENTOR.
G. R. Stutzman,
BY
H. H. Losche
Att'ys.

United States Patent Office 3,412,462
Patented Nov. 26, 1968

3,412,462
METHOD OF MAKING HERMETICALLY SEALED THIN FILM MODULE

Guy Robert Stutzman, Fort Wayne, Ind., assignor to the United States of America as represented by the Secretary of the Navy Original application May 6, 1965, Ser. No. 453,848, now Patent No. 3,316,459, dated Apr. 25, 1967. Divided and this application Nov. 7, 1966, Ser. No. 600,331
7 Claims. (Cl. 29—627)

The invention described herein may be manufactured and used by or for the Government of the United States of America for governmental purposes without the payment of any royalties thereon or therefor.

This is a division of application Ser. No. 453,848 (series of 1960) filed May 6, 1965, now Patent No. 3,316,459, entitled Hermetically Sealed Thin Film Module and Method of Making Same.

This invention relates to thin film modules and more particularly to the method of constructing a moisture and air proof hermetically sealed module which module has terminal pins to which the internal thin film circuit and an external etched circuit makes molecular contact, and to which discrete elements are welded. The module hermetically seals in a helium gas which readily conducts heat generated by the thin film circuit to the cover providing a self-contained heat sink.

The production of thin film modules for thin film multilayer circuitry, as used in radar or the like, is well-known. These modules have been produced with extended connector leads in parallel relation forming a multiple connector to adapt them for replacement plugging into multilayer circuitry. As circuit designs for these modules increase in complexity requiring more cross-overs from one module to another, the failure rate of these modules increases due to insulation breakdown. This insulation failure has been traced to the dielectric film or material, such as silicon monoxide film or other plastic means, between the thin film circuit layers. Conformal coatings, such as silicones and epoxies or the like, have been used to encapsulate or seal the thin film circuits to form a barrier against moisture absorption. However, it has been found that this dielectric material acts as a sponge soaking up the moisture from the ambient air forcing its way through the junction of the conformal coating and multiple connector electrical leads to the interior by capillary action. An important factor of these plastic encapsulated modules is the extreme forces of capillary action of the moisture which destroys the junction of the plastic sealing compound on the electrical conductors coming through the plastic encapsulated means from the thin film circuit to the outside termination. While the condition of moisture could be corrected by hermetically sealing the entire assembly of multilayer circuitry, it would interfere with and actually prevent the interchangeability of individual plug-in modules. Accordingly, it is necessary to seal each thin film module independent of the others.

Another disadvantage of the plastic encapsulated thin film module is the use of chromium (Cr) and copper (Cu) providing the thin film circuit conductors which do not lend themselves to the solder bonding of discrete elements thereto, such as microminiature transistors and diodes. Solder bonding of these discrete elements to Cr, Cu thin film circuitry often loosens the thin film circuitry from the glass substrate. Since Cu does not readily adhere to the glass substrate by vacuum deposition, the circuit must first have Cr deposited on the glass substrate with the Cu deposit on top of the Cr.

Another disadvantage to the thin film deposition of Cr, Cu on a glass substrate is that resistance welding of leads or of discrete elements to the thin film terminations or circuitry is not possible due to the spot heating of the glass substrate surface. A chip of glass will leave the substrate at the point of the welder electrode contact which severs the film from the circuit termination.

A still further disadvantage of the plastic encapsulated thin film circuitry is that the thin glass substrate requires that it be cemented to a heat sink. The cement sets up causing severe strains in the glass substrate which has a tendency to crack the glass during thermal changes or vibration.

In the present invention a glass substrate is melted around a matrix of metal pins within a metal cup or can such that the glass and the metal are chemically attached by a bond of the glass oxide to the metal oxide which prevents a capillary from forming and which sets as a barrier against moisture. The forces of capillary action are less than the forces of chemical bonding and therefore the moisture seal is not destroyed. The metal cup or can and terminal pins, which include registration pins and capacitor terminal blocks, and the glass substrate are chosen to be of the same coefficient of thermal expansion so that perfect glass-to-metal seals are established at each glass-to-metal joint without physical stress after cooling. For an example, the metal cup or can and the metal registration and terminal pins and capacitor pads may be of a material known by their trade names as Kovar or Rodar and the glass substrate may be of a Corning number 7052 or number 7059 having like coefficients of thermal expansion, although other metals or glass substrates may be used where their coefficients of thermal expansion are compatible. It also may be envisioned that vitreous materials other than glass or even thermosetting plastic material may be used where its coefficient of thermal expansion is the same as the metal parts. The glass substrate may be drilled to match the registration and terminal pins and capacitor block arrangement in the metal cup and heated in the cup member to fuse the glass and metal, or the glass substrate may be a pure blank and brought to a molten temperature and pressed into the cup to flow around the terminal pins and capacitor pads to form the glass-to-metal seal. The exposed face of the glass substrate is then optically lapped or polished to expose one end of each of the terminal pins and capacitor pads on which thin film circuitry is vacuum deposited. Since the thin film circuitry will terminate at the several terminal pins, aluminum (Al) can be vacuum deposited directly onto the glass substrate overlaying the terminal pins making a molecular bond to the glass and the terminal pins. Discrete elements, such as transistors and diodes, may be welded to the terminations of the thin film Al circuitry over the terminal pins since this welding is now to a substantial mass of metal and not to the thin film alone. This thin film module is covered by a metal cover of the same metal as the cup in an atmosphere of helium (He) gas and soldered, welded, or otherwise metallically fused to the metal cup to form a thin film circuit module. The direct contact of the glass to the metal cup and the thermal conductivity of the helium gas provide an excellent heat sink for the thin film circuitry. It is accordingly, a general object of this invention to produce, by a unique method of fabrication, a thin film electrical circuit module that is hermetically sealed against moisture absorption, that has terminals to which thin film circuitry and discrete circuit components can be welded, and that provides a self-contained heat sink for the thin film circuit.

These and other objects and the attendant advantages, features, and uses will become more apparent to those skilled in the art as the description proceeds when considered along with the accompanying drawings in which.

Figure 1:
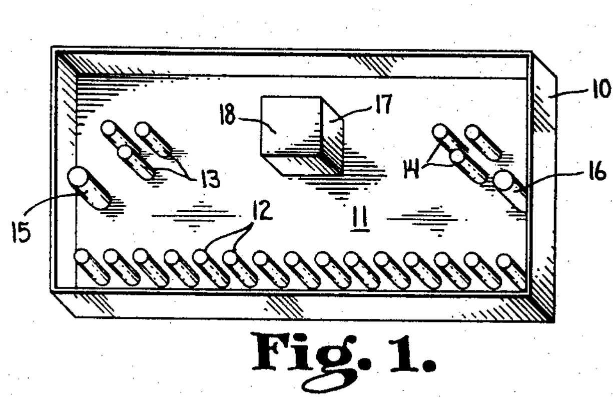
FIGURE 1 illustrates an isometric view of a metallic cup with metallic terminal pins and a capacitor block fixed to the bottom thereof by welding and constituting a form for a glass substrate.
Figure 9:
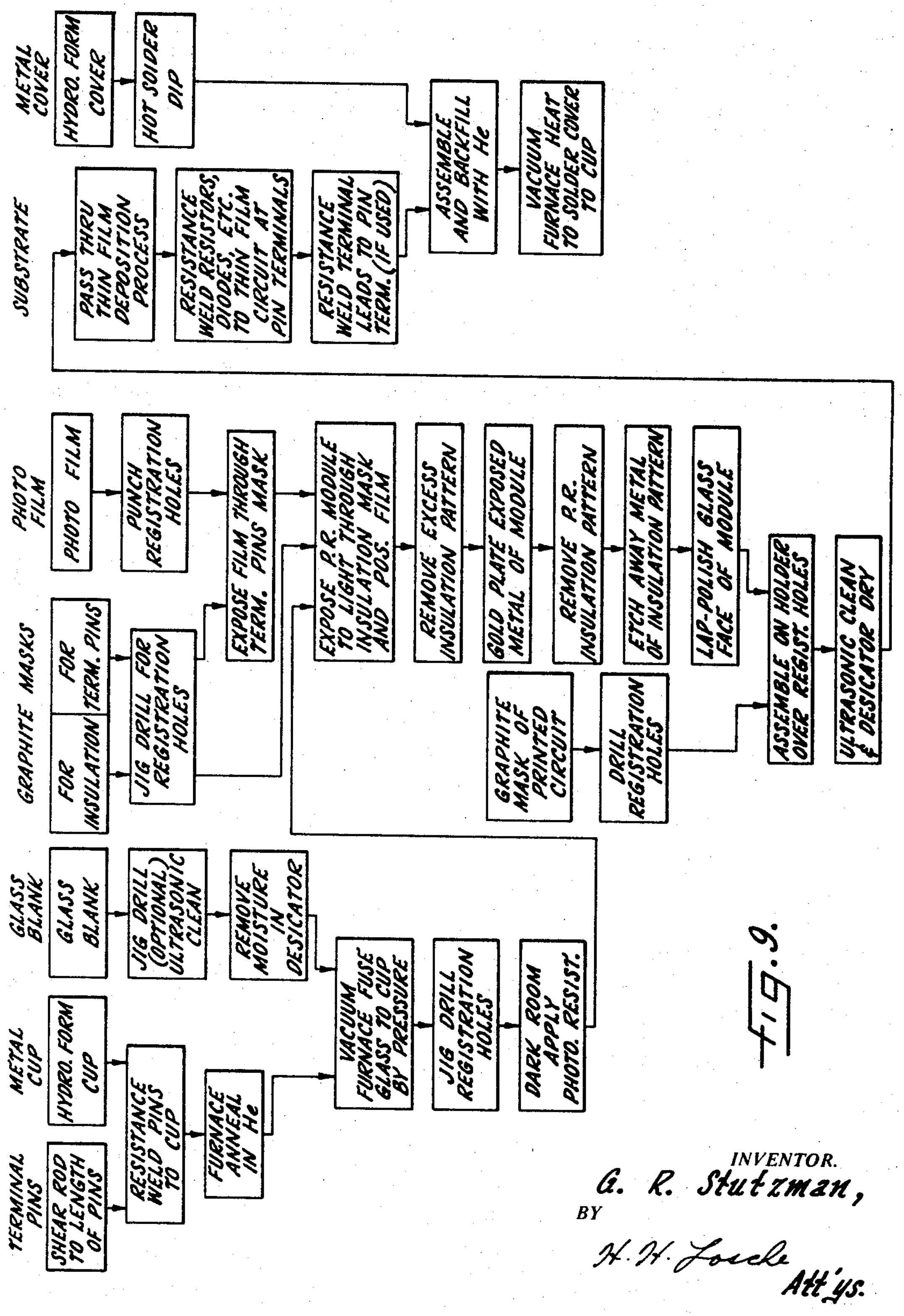
FIGURE 9 illustrates a block diagram of the method steps used in the production of the thin film module of FIGURES 1 through 8.

Referring more particularly to FIGURE 1 with occasional reference to FIGURE 9 showing the method of construction, a rectangular metal cup member 10 is preformed from sheet material by a press, such as hydroform or hydraulic press. A rod of the same metal material as the cup member 10 is cut or sheared into lengths equal to the internal depth dimension of the cup member 10. A row of these terminal pins 12 are welded to the bottom or floor 11 of the cup member 10 in equal spaced relation extending upwardly in the cup, as illustrated in FIGURE 1. Other terminal pins such as 13 and 14 may be placed and welded to the bottom 11 of the cup member 10 in accordance with desired circuit requirements but herein illustrated, for the purpose of an example, as being in two groups near opposite ends of the cup member 10. Enlarged registration pins 15 and 16 are welded to the cup bottom 11 at opposite ends of cup member 10. A capacitor pad or block 17, of the same metal as the terminal pins 12, registration pins 15, 16, and cup member 10 is welded to the bottom 11 of the cup member 10 and extends upwardly so that the upper face 18 will be in the same plane as the upper edge or rim of the cup member 10, the upper ends of the terminal pins 12, 13, and 14, and the tops of registration pins 15, 16.

Figure 2:
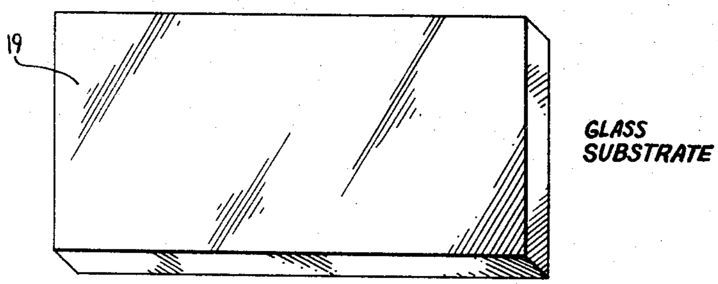
FIGURE 2 illustrates an isometric view of a glass substrate blank.

Referring to FIGURES 1 and 2 with occasional reference to FIGURE 9 for method steps, FIGURE 2 illustrates a preformed glass substrate 19 which may be drilled to have holes corresponding in a place and diameter with the pins 12 through 16, and an opening corresponding to the size of the capacitor block 17 in FIGURE 1 to facilitate the bonding of the glass to the metal by heat treatment, although this drilling may be eliminated, where desired. Prior to the fusing of the glass to the metal, the metal cup 10 with its terminal pins, registration pins, and capacitor blocks 12 through 17 must have a thin defused skin of iron (Fe) and Cr on the sealing surface to facilitate wetting of the glass to a controlled oxide. The cup 10 and its integral parts are then annealed in wet hydrogen at 1800° F. If the glass blank 19, as shown in FIGURE 2, is placed over the cup member 10 and weighted on top with a graphite block, placed in a vacuum furnace, and brought up to a temperature at which the glass becomes slightly molten, the glass blank 19 will be pressed into the cup member 10 and the terminal pins 12, 13, 14, registration pins 15, 16, and the capacitor block 17 will be forced through the glass blank and, upon cooling, the glass will seal to the metal by a chemical bond. If the glass blank 19 is drilled prior to the glass-to-metal seal in the cup 10, there is some possibility of air bubbles forming between the glass and metal and extreme care must be used in the operation of pressing the glass substrate into the cup member 10 under heated conditions to eliminate these air bubbles. The method of pressing the undrilled glass blank 19, such as shown in FIGURE 2, into the cup member 10 in a molten state is preferred since the probability of getting air bubbles at the juncture of the glass and metal is quite remote.

Figures 5, 6:
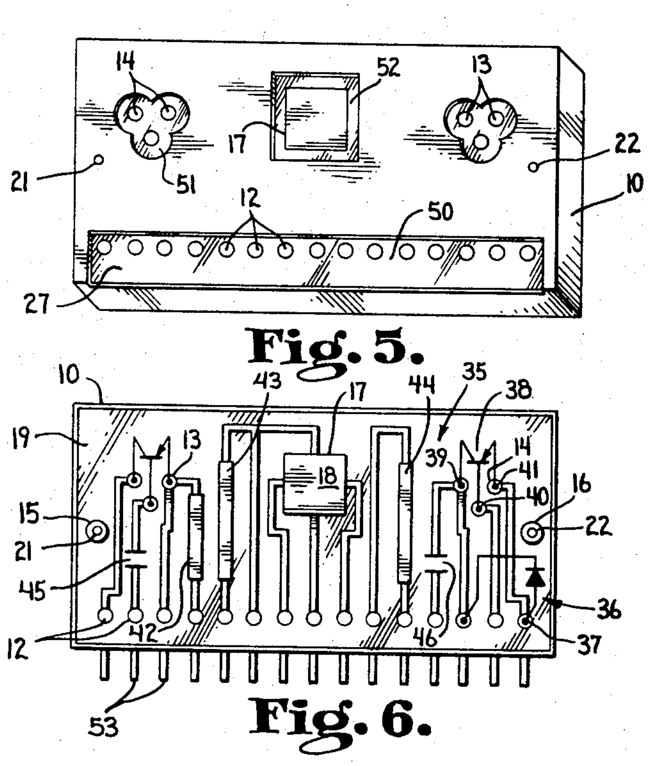
FIGURE 5 illustrates the botoom view of the metallic cup of FIGURE 1 after the glass substrate of FIGURE 2 has been molded therein and the metal has been etched away.
FIGURE 6 is a top view of FIGURE 5 with a thin film circuit illustrated thereon and terminal connectors or leads attached thereto.

Referring more particularly to FIGURE 5 and also to FIGURE 9, after the glass-to-metal seal has been accomplished and the module has been annealed, a registration hole is drilled at opposite ends of the module concentrically through each registration pin 15, 16 and the cup 10, such as 21 and 22 (shown in FIGURE 6), for the purpose of registration with dowel pins in a vacuum deposition holder, soon to be more fully described.

Two graphite masks are made in accordance with the process shown and described in my patent application entitled Pattern Mask and Method for Making Same, Ser. No. 308,606, filed Sept. 12, 1963. One mask is cut to position openings precisely over the terminal ends 12, 13, and 14 and the capacitor block 17 through the bottom 11 while the other graphite mask is cut to provide an insulation band around each terminal and block. For example, referring to the fractional view of FIGURE 3, the first graphite mask will have cut openings 25 exactly overlaying terminal pins 14, if projected through the bottom 11. The second graphite mask will have cut openings 26 to provide an insulation band 27 around each terminal pin 14. A photographic film is exposed through the first graphite mask of the terminal pins to provide a positive photographic film of the terminal pins 12–14 and capacitor block 17. The glass and metal cup module is then covered with a photographic resist material in a dark room.

Figures 3, 4:
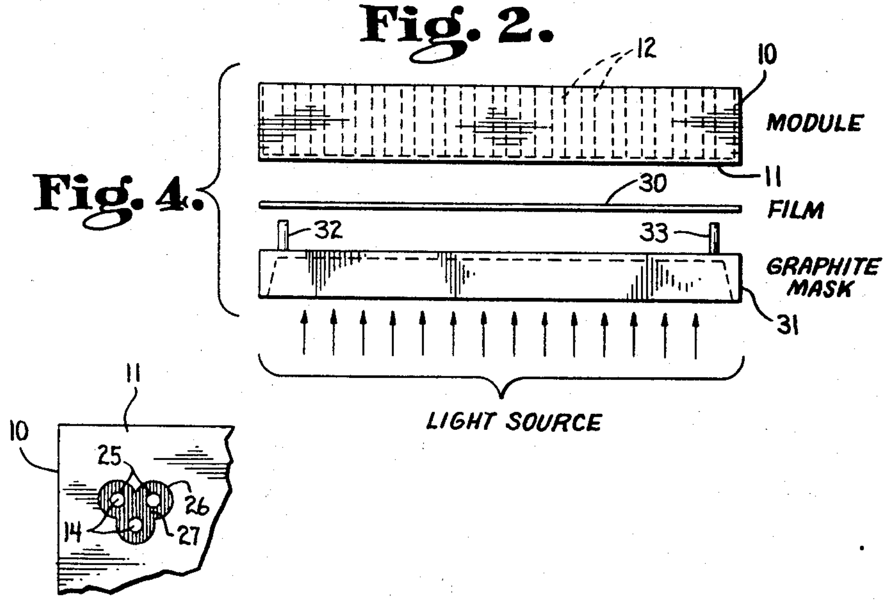
FIGURE 3 illustrates a cutaway portion of the bottom corner of the cup member overlaying terminal pins with a photographic resist insulation band thereon.
FIGURE 4 illustrates an exploded view of the module, a film, and a graphite mask exposing photographic resist material on the module to light.

Referring more particularly to FIGURE 4, the exposed positive photographic film, herein designated by the reference character 30, is sandwiched between the module 11 and the second graphite mask having the insulation openings 26 therein and designated by the reference character 31. FIGURE 4 illustrates this sandwiched assembly in an exploded view with dowel pins 32 and 33 positioned to pass through registration holes 21 and 22 in the glass and metal cup module to maintain proper registry. A light source exposes the photographic resist material in the insulation band 27 around the terminal pins 12–14 and capacitor block 17. The module is removed from this assembly in FIGURE 4 and the photographic resist removed from all the module except the insulation bands 27. Exposing the photographic resist to light causes the insulation bands 27 to resist being washed away and consequently the insulation bands 27 of photographic resist material remain on the bottom 11 of the metal cup 10. The module is then gold plated directly on the exposed metal surface, thereby missing the insulation bands 27. The photographic resist material is then removed from the insulation bands 27 by any well known means and the metal cup bottom 11 is etched away with acid, as shown in FIGURE 5. The gold plating resists acid etch and consequently only the insulation bands 27 are affected. The insulation bands 27 in FIGURE 5 consist of the glass substrate 19. The metal portion etched away around the terminal pins 12 is the insulation band 27 which extends to the side of the cup member 10 providing a multiple male connector for plug-in to a female connector in multilayer circuitry. The exposed glass substrate surface on the opposite side of that shown in FIGURE 5 is lapped and polished to an optical surface until the predetermined thickness dimension of the module is accomplished. This module is then placed in a holder (not shown) with registration pins passed through the open registration holes 21 and 22 and a graphite mask (not shown) for the thin film circuitry is placed on the optically polished surface of the module. The graphite mask is of the type more fully shown and described in my above-mentioned patent application which more fully describes the process for the evaporation deposition of conductors. This assembly for thin film deposition is cleaned by an ultrasonic cleaner and dried by a desiccator dryer and then passed through the sequence of thin film evaporation deposition for placing a circuit of conductive metal, preferably Al, thereon, such as the circuitry 35 shown in FIGURE 6. The capacitor block 17 serves to place alternate layers of silicon monoxide and metal, such as Al, on the face 18 to provide capacitor plates.

Referring more particularly to FIGURES 6 and 9, discrete microminiature elements are connected into the thin film circuitry by welding the leads, such as from a diode 36, to the thin film circuitry directly over a terminal pin 12 (see also FIGURE 8) at the point 37. In like manner a microminiature transistor, such as 38, is shown having its terminals connected to the thin film circuitry at the terminations of the terminal pins 14 at points 39, 40, and 41. The thin film circuitry 35 may include thin film resistance elements, as illustrated by 42, 43, and 44, and also thin film capacitors as illustrated by 45 and 46. The resistor elements consist of a thin film cermet layer defined in length by a silicon monoxide layer and terminated by thin film Al conductors which make intrametallic junction with the terminal pins. The thin film conductors of circuit 35 are preferably Al to which the several discrete elements 36 and 38 may be readily welded at terminal pins by spot resistance welding means so that the leads of the discrete elements and the termination of the thin film conductors are permanently fixed and not subject to lift-off.

Figure 8:
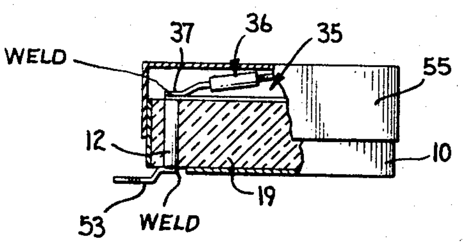
FIGURE 8 illustrates an end elevational view of the thin film module with a corner portion broken away to show a portion of the glass substrate with a terminal pin therein having a terminal lead and a discrete element on the thin film circuit welded thereto.

Referring again to FIGURE 5 and to FIGURES 8 and 9, by etching away a portion of the metal bottom 11 of the cup 10 from these terminals exposing the bottom side of the glass substrate as at 50, 51, and 52, the terminal pins and capacitor block are electrically insulated from the cup member 10. To each of the terminal pins 12 in a row on the bottom side of the module shown in FIGURE 5 may be connected a terminal connector or lead 53, as shown in FIGURE 8, by resistance spot welding. The terminal leads 53 may be added where it is desirable to plug into a conventional female connector, although the module may be used as a multiple male connector, shown in FIGURE 5, as aforesaid. The terminal connectors or leads 53 from the terminal pins 12 extend outwardly in parallel past the cup member 10, as shown in FIGURE 6, to provide the multiple connector for the module.

Figure 7:
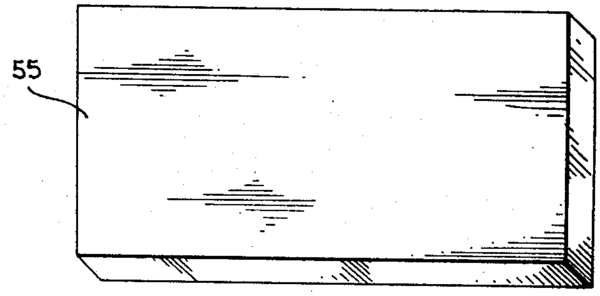
FIGURE 7 illustrates an isometric view of the metal cover.

Referring more particularly to FIGURES 7, 8, and 9, FIGURE 7 illustrates a cover 55 which is pressed out of sheet material by hydroform or hydraulic press equipment to provide an inverted cup-shaped cover to exactly telescope over the member 10, as shown in FIGURE 8. The cover member 55 is dipped in a hot soldering dip around the peripheral edge or rim and the module and cover are then placed in a vacuum furnace. The heat is raised in the vacuum furnace to about 250° F. for drying and outgassing vacuum. As soon as the module and cover members are free of moisture, the vacuum furnace chamber is filled with dry helium gas and then evacuated to flush the enclosure. The cover member 55 is placed over the module cup member 10, as shown in FIGURE 8 after helium gas is again bled into the chamber at one atmosphere pressure and the temperature is raised to the melting point of the solder at which time the solder flows to fuse with both the cup member 10 and cover member 55 to provide a hermetic seal with the helium gas of one atmosphere trapped within the enclosure. This completed module can then be tested in a Helium Mass Spectrometer Leak Detector to detect any leaks in the module.

The completed circuit module, as shown in FIGURE 8, readily adapts itself in the method of production to the use of a circuit layout, using computer prepared tape for automation, and standardized probe points for circuit testing. Pre-formed fixtures, for nesting and positioning the terminal pins and capacitor blocks within the cup 10 and for positioning the terminal leads 53 for welding to the ends of the terminal pins 12, may be used in automating the assembly. The terminal pins 12, 13, and 14, and the capacitor block 17 may be welded to the cup member 10, using numerical control equipment that can be readily obtained from commercial sources. This will allow the circuit designer all the freedom he needs to customize the thin film modules. During the process of fabricating the module, a monitor could be provided for resistor deposition by probing the back side of resistor terminal pins during the deposition cycle on each individual substrate.

The completed thin film module, as shown in FIGURE 8, is hermetically sealed against any moisture entering the chamber enclosing the thin film circuit 35 since the glass substrate 19 is bonded chemically to the sides and bottom of the cup member 10 and to all terminal pins 12, 13, and 14, and to block 17. The bonding of the cover member 55 to the cup member 10 prevents moisture leakage into the chamber enclosing the thin film circuit 35. All thin film Al circuitry 35, as well as discrete elements such as 36, 38, are welded only at terminal pins 12, 13, and 14, and to block 17, this welding being to a substantial mass of metal and not to the thin film circuitry itself. In like manner the terminal connectors or leads 53, when used, are all welded to the terminal pins 12 eliminating all soldering of the thin film circuitry and thereby avoiding any peeling of the circuitry or breaking of the solder connections by heat or vibration. As shown more clearly in FIGURE 5, other lead connections may be welded to the terminal pins 13 and 14 to complete the thin film circuitry or for a separate circuit where these elements are not subject to moisture conditions. Likewise, these terminal pins 13 and 14 may be used for crossover junctions where necessary to interconnect other circuit layers or modules. If necessary, the bottom 11 of the cup member 10 may be etched as described above for etching the pin and block areas to provide an exposed printed circuit from the several terminal pins 12, 13, and 14, and the capacitor block 17 where such circuitry is likewise not subject to moisture interference. The bottom face of capacitor block 17 may have a plurality of capacitor plates evaporated thereon in the same manner as the face 18.

Referring more particularly to FIGURE 9, the steps of fabricating the thin film modules, shown and described for FIGURES 1 through 8, advance downwardly from the legend headings of the terminal pins, cup member, glass blank, graphite mass, photo film, substrate, and cover to the end result at the bottom. While a few of these steps may be taken out of order from that shown, each step should be completed to provide the moisture proof module as shown in FIGURE 8 of the drawings.

While many modifications and changes may be made in the steps of the method of fabrication to accomplish the results of a completely moisture proof plug-in type thin film circuit module, it is to be understood that I desire to be limited in the scope of my method of construction only by the scope of the appended claims.

I claim:

1. A method of making a hermetically sealed thin film electric circuit module comprising:
   - press forming a cup-shaped member of metal;
   - affixing a plurality of metal pins and capacitor blocks to the bottom of said cup-shaped member to extend upwardly thereof to the plane of the cup rim, said cup-shaped member, metal pins, and capacitor blocks having the same thermal expanding rates;
   - heating a vitreous substrate blank of the same thermal expanding rate to a molten state and pressing said vitreous substrate into said cup causing said vitreous substrate to flow around said plurality of metal pins and capacitor blocks and to hermetically seal thereto and to said cup upon cooling;
   - etching out portions of said metal cup bottom surrounding said metal pins and capacitor blocks providing electric insulation of said metal pins and blocks from said metal cup and from each other;

lap-polishing the exposed surface of said vitreous substrate producing a common optical plane for said vitreous substrate, said metal pins, and said capacitor blocks;

thin film vacuum depositing a thin film circuit on said exposed surface of said vitreous substrate connecting said metal pins and capacitor blocks at the thin film circuit terminations;

resistance welding discrete transistors and diodes to said thin film circuit terminations at said metal pins;

forming a multiple connector means on the exposed ends of the metal pins exposed by said etching away of said metal cup; and welding a metal cover on the periphery of said metal cup to hermetically seal in said thin film circuitry whereby a thin film moisture resistant module is provided for electric plug-in use.

2. A method of making a hermetically sealed thin film electric circuit module as set forth in claim 1 wherein said forming a multiple connector means consists in etching away said metal cup between said terminal pins and the edge of said metal cup to provide a vitreous substrate surface unobstructed to said terminal pins.

3. A method of making a hermetically sealed thin film electric circuit module as set forth in claim 1 wherein said forming a multiple connector means consists in welding a terminal lead to each exposed end of the metal pins along one edge of said metal cup exposed by etching away of said metal cup, said terminal leads being welded to extend in parallel relation past the metal cup adapted for insertion with a companion connector.

4. A method of producing a hermetically sealed thin film electric circuit module comprising:

press forming two metal sheets into a cup-shaped member and an inverted cup-shaped cover of interfitting rims;

resistance welding a plurality of terminal pins, registration pins, and at least one capacitor block to the bottom of said cup member extending outwardly to the plane of the periphery of the cup rim;

furnace heating said cup member and a glass substrate of a volume equal to said cup and pressing said glass substrate in a molten state into said cup and around said terminal pins and capacitor block causing said glass to molecularly seal to said metal cup, terminal pins, registration pins, and said capacitor block, said glass, cup, cover, pins, and capacitor block material being of the same coefficient of thermal expansion;

jig drilling registration holes through said registration pins and cup bottom;

masking a film with registration holes punched therein to expose same to precisely overlay said terminal pins and capacitor block if projected through said cup-shaped member bottom;

applying photographic resist material to the bottom of said cup-shaped member in a dark room;

exposing said cup-shaped member bottom to light through said film and mask with registration holes therein to provide exposed areas surrounding each terminal pin and capacitor block establishing insulation areas;

cleaning off said unexposed photographic resist material;

gold plating said cup-shaped member, except said exposed insulation areas, to resist acid etch and then removing the exposed photographic resist material;

etching away said insulation areas with acid to expose said glass substrate thereby insulating said terminal pins and capacitor blocks from said cup-shaped member;

lap-polishing the exposed surface of said glass substrate producing an optical plane for said glass substrate, said terminal pins, said registration pins, and said capacitor block;

assembling said glass substrate and cup on a holder with a graphite mask in registry with dowel pins in said registration holes and ultrasonically cleaning same;

thin film vacuum depositing a thin film circuit including resistors and capacitors on said exposed surface of said glass substrate overlaying the conductor terminations with the exposed ends of said terminal pins;

welding discrete circuit components to preselected terminal pins through said circuit terminations;

welding terminal leads to said ends of said terminal pins opposite said lap-polished surface, said terminal leads extending in parallel beyond the periphery of said cup member to provide a multiple connector for said thin film circuit; and metal fusing said cup-shaped cover over the exposed surface of said glass substrate with said thin film circuit thereon to said cup member in an atmosphere of a gas hermetically sealing said gas within said cup member and said cover in the area of said thin film circuit to provide a thin film module that is moisture resistant and conductive of heat generated by the thin film circuit through the gas, cover, and substrate to the atmosphere.

5. A method of producing a hermetically sealed thin film electric circuit module as set forth in claim 4 wherein said metal fusing of said cover to said cup member is by hot solder dipping said cover and assembling the cover on said cup member and raising the temperature of same until said solder flows and fuses to both cover and cup member.

6. A method of producing a hermetically sealed thin film electric circuit module as set forth in claim 4 wherein said welding of said discrete circuit components to preselected terminal pins consists in welding the leads of active transistors and diodes.

7. A method of producing a hermetically sealed thin film electric circuit module as set forth in claim 4 wherein said gas in helium.

References Cited

UNITED STATES PATENTS

| | | | |
|---|---|---|---|
| 3,029,495 | 4/1962 | Doctor | 29—627 |
| 3,187,240 | 6/1965 | Clark. | |
| 3,300,832 | 1/1967 | Cave | 29—580 |
| 3,195,026 | 7/1965 | Wegner et al. | |

WILLIAM I. BROOKS, *Primary Examiner.*